US010473122B2

(12) United States Patent
McFarland (10) Patent No.: US 10,473,122 B2
(45) Date of Patent: Nov. 12, 2019

(54) COMPACT AIR ASPIRATOR WITH ANNULAR EJECTOR

(71) Applicant: GOODRICH CORPORATION, Charlotte, NC (US)

(72) Inventor: Eric McFarland, Laveen, AZ (US)

(73) Assignee: GOODRICH CORPORATION, Charlotte, NC (US)

( * ) Notice: Subject to any disclaimer, the term of this patent is extended or adjusted under 35 U.S.C. 154(b) by 271 days.

(21) Appl. No.: 15/647,771

(22) Filed: Jul. 12, 2017

(65) Prior Publication Data

US 2019/0017519 A1    Jan. 17, 2019

(51) Int. Cl.
*F04F 5/16*    (2006.01)
*B64D 25/14*   (2006.01)
*F04F 5/46*    (2006.01)
*B60C 29/00*   (2006.01)
*F04F 5/42*    (2006.01)

(52) U.S. Cl.
CPC ............... *F04F 5/463* (2013.01); *B63C 9/24* (2013.01); *F04F 5/466* (2013.01); *B64D 25/14* (2013.01); *F04F 5/42* (2013.01)

(58) Field of Classification Search
CPC .. B64D 25/14; B64D 25/08; F04F 5/16; F04F 5/18; B63C 9/24
See application file for complete search history.

(56) References Cited

U.S. PATENT DOCUMENTS

| | | | |
|---|---|---|---|
| 3,591,314 A | 7/1971 | Day | |
| 3,684,404 A * | 8/1972 | Galbraith | F04F 5/466 417/179 |
| 3,910,532 A * | 10/1975 | Fischer | B64D 25/14 182/48 |
| 4,368,009 A * | 1/1983 | Heimovics, Jr. | B61B 12/005 417/179 |
| 6,071,084 A * | 6/2000 | Wass | F04F 5/463 137/888 |
| 9,039,038 B2 | 5/2015 | Breed | |

* cited by examiner

*Primary Examiner* — Brian M O'Hara
(74) *Attorney, Agent, or Firm* — Snell & Wllmer, L.L.P.

(57) ABSTRACT

An aspirator assembly for an inflatable device includes an outer housing disposed about an axis, an inner housing disposed about the axis, and a manifold coupled through the outer housing to an annulus located between the inner housing and the outer housing, the manifold providing pressurized gas to said annulus via a plurality of gas ejector nozzles. The annulus may be divided into a plurality of annulus segments by a plurality of vanes protruding radially from the inner housing.

19 Claims, 6 Drawing Sheets

COMPACT AIR ASPIRATOR WITH ANNULAR EJECTOR

FIELD

The disclosure relates generally to aspirators for inflatable devices having a compact assembly.

BACKGROUND

Typical evacuation slides include an air aspirator for filling the slide as part of their inflation systems. An aspirator usually allows the inflatable systems to intake gas for inflation and to retain gas after inflation.

In an aircraft, available volume and weight capacity come at a premium. A common problem with evacuation systems is pack density. Pack density refers to the amount of packed slide and components occupied in response to the system being packed into the space available. Pack weight is an additional consideration. As such, the aspirator should be compact in order to minimize pack space. Aspirators currently employed in typical aircraft inflatable systems are typically axial-flow and may be relatively bulky, especially in the length dimension. Causes of the bulky and lengthy dimensions include, for example, the mixing length required to transfer momentum from the primary, high-pressure gas which drives the aspiration, and the secondary, atmospheric gas which is accelerated by the primary.

SUMMARY

An aspirator assembly for an inflatable device is provided. In various embodiments, an aspirator assembly for an inflatable device includes an outer housing disposed about an axis, an inner housing disposed about the axis, and a manifold coupled through the outer housing to an annulus located between the inner housing and the outer housing, the manifold providing pressurized gas to the annulus via a plurality of gas ejector nozzles.

In various embodiments, the annulus of the aspirator assembly is divided into a plurality of annulus segments by a plurality of vanes protruding radially from the inner housing. In various embodiments, the plurality of vanes of the aspirator assembly that protrude radially from the inner housing circularly about the outer housing. In various embodiments, the plurality of vanes that protrude radially from the inner housing circularly connect mechanically to the outer housing to prevent a dead zone from occurring in the annulus. In various embodiments of the aspirator assembly, there is a joint or attachment between the abutment of the vanes with the inner housing and the outer housing.

In various embodiments, the seal of the aspirator assembly is connected to the inner housing and the outer housing using at least one of a braze, a weld, an adhesive, or a fastener. In various embodiments, a single piece construction may also be possible. In various embodiments, the plurality of annulus segments of the aspirator assembly are approximately equal in width and height. In various embodiments, the annulus of aspirator assembly is a gap between the inner housing and the outer housing.

In various embodiments, the aspirator assembly includes a check cap affixed to the outer housing. In various embodiments, the check cap has a biasing member coupled to the check cap, the biasing member being able to bias the check cap closed using a biasing force. In various embodiments, the biasing member of the aspirator assembly is spring loaded. In various embodiments, an evacuation slide assembly includes a slide and an aspirator assembly. The aspirator assembly includes an outer housing coupled to the slide, an inner housing engaged with the outer housing; and a manifold coupled through the outer housing to an annulus located between the inner housing and the outer housing, the manifold providing pressurized gas to the annulus via a plurality of gas ejector nozzles.

In various embodiments, the annulus of the evacuation slide assembly is divided into a plurality of annulus segments by a plurality of vanes protruding radially from the inner housing. The plurality of vanes of the evacuation slide assembly that protrude radially from the inner housing circularly abut the outer housing. The plurality of vanes of the evacuation slide assembly that protrude radially from the inner housing circularly connect mechanically to the outer housing to prevent a dead zone from occurring in the annulus. In various embodiments of the aspirator assembly, the plurality of vanes that protrude radially from the inner housing circularly connect mechanically to the outer housing to provide a length to width ratio sufficient to ensure complete mixing of a primary gas and entrained air. In various embodiments, annular segments may be created having an adequate/desired length to width ratio to ensure ejector gas mixing.

In various embodiments, there is a joint between the abutment of the plurality of vanes with the inner housing and the outer housing of the evacuation slide assembly. In various embodiments, an aircraft having an evacuation slide assembly includes a housing, a panel covering the housing, a slide retained within the housing, an aspirator assembly coupled to the slide. The aspirator assembly includes an outer housing coupled to the slide, an inner housing engaged with the outer housing, and a manifold coupled through the outer housing to an annulus located between the inner housing and the outer housing, the manifold providing pressurized gas to the annulus via a plurality of gas ejector nozzles. The annulus of the aspirator assembly of the aircraft is divided into a plurality of annulus segments by a plurality of vanes protruding radially from the inner housing.

The plurality of vanes of the aspirator assembly of the aircraft that protrude radially from the inner housing circularly abut the outer housing. In various embodiments, the aircraft having an evacuation slide assembly, further includes a check cap affixed to the outer housing, wherein the check cap has a biasing member coupled to the check cap, the biasing member being able to bias the check cap closed using a biasing force.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
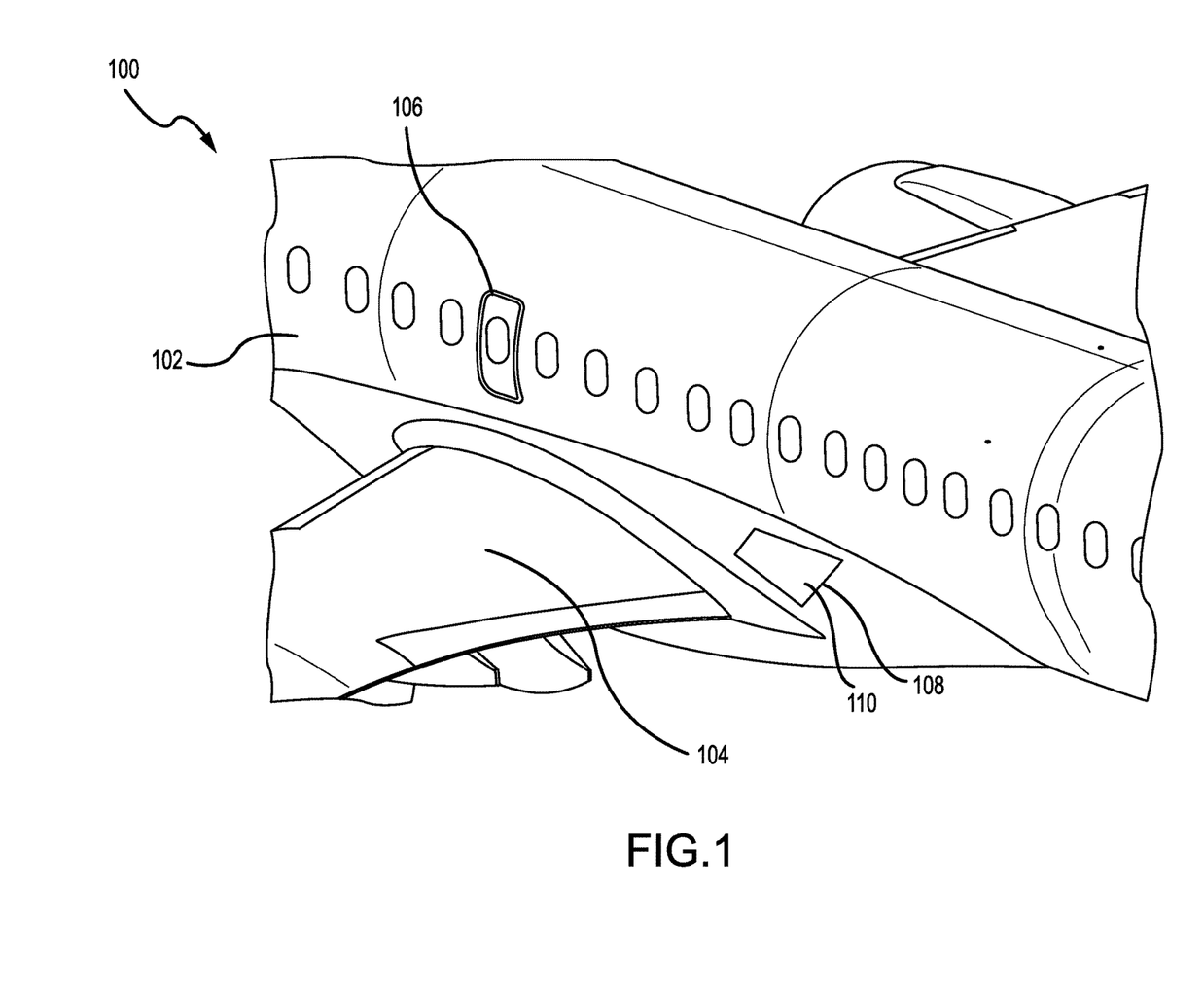
FIG. 1 illustrates an exemplary aircraft evacuation system, in accordance with various embodiments.

Referring to FIG. 1, an exemplary aircraft 100 is shown, in accordance with various embodiments. Aircraft 100 may comprise a fuselage 102 with wings 104 fixed to fuselage 102. Emergency exit door 106 may be disposed on fuselage over wing 104 such that passengers exiting emergency exit door 106 would exit onto wing 104. An evacuation slide assembly 108 may be disposed aft of emergency exit door 106. Panel 110 may cover evacuation slide assembly 108 when installed on aircraft 100. Evacuation slide assembly 108 may jettison panel 110 and deploy an inflatable slide in response to emergency exit door 106 opening. In various embodiments, a more common internal door-mounted escape system may be utilized.

Figure 2:
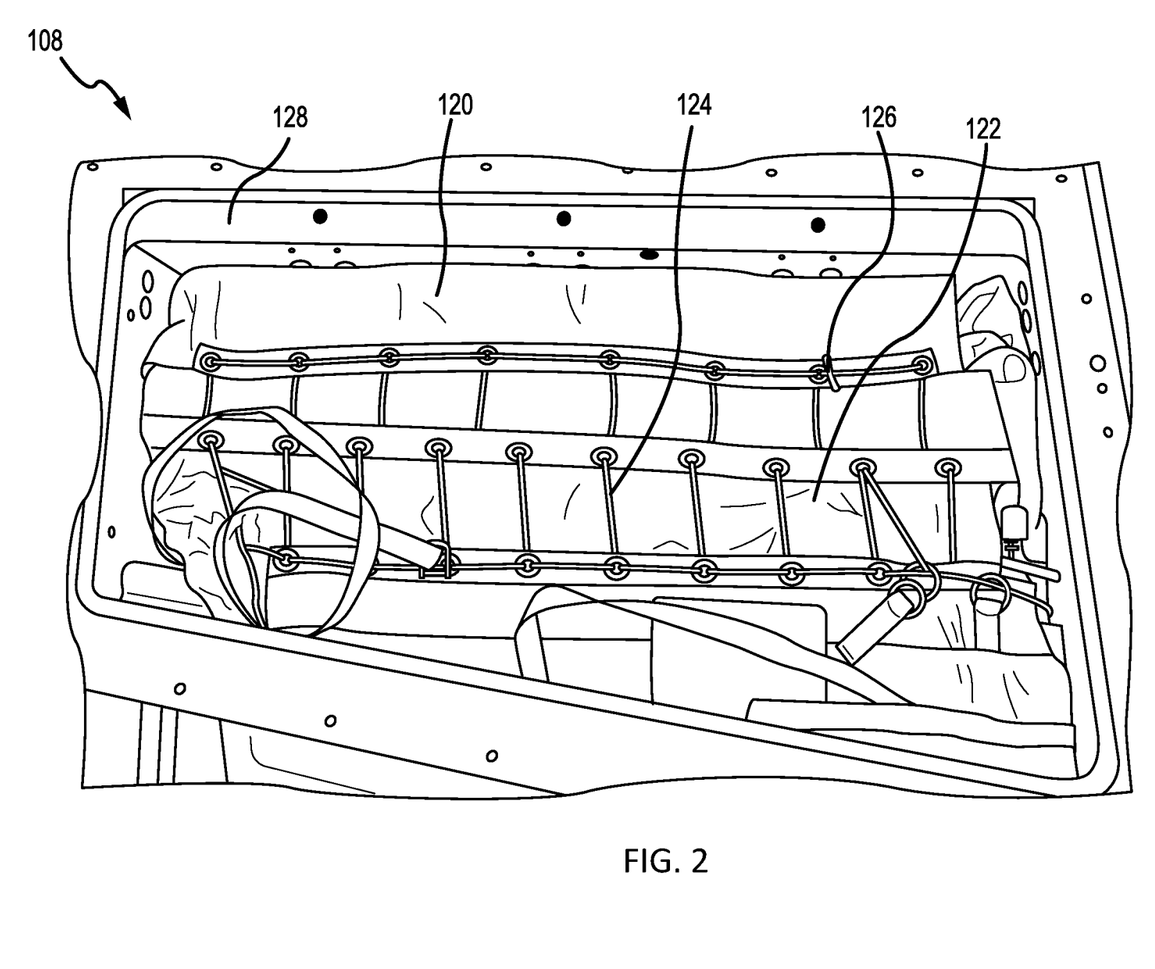
FIG. 2 illustrates an emergency evacuation assembly including a slide in a fabric pack with a laced enclosure and release pin, in accordance with various embodiments.

With reference to FIG. 2, evacuation slide assembly 108 is shown as viewed from an outboard side with panel 110 (of FIG. 1) removed from panel interface 128, in accordance with various embodiments. Evacuation slide assembly 108 may comprise soft cover 120 containing slide 122. Soft cover 120 may have lace 124 to enclose soft cover 120 and retain slide 122. Lace 124 may be in a daisy chain or speed lacing configuration with pin 126 closing the daisy chain or speed lacing. Pin 126 may be slideably coupled to lace 124 such that lace 124 may unlace in response to movement of pin 126. In that regard, pin 126 may prevent lace 124 from unfurling and releasing slide 122 while pin is in place. An actuator may be positioned to pull pin 126 and release slide 122 from soft cover 120. Pin 126 may be disposed in a retaining structure and the translated away from the retaining structure to release lace 124. Although a pin and actuator release mechanism is shown, any suitable release mechanism may be used in evacuation slide assembly 108.

Figure 3:
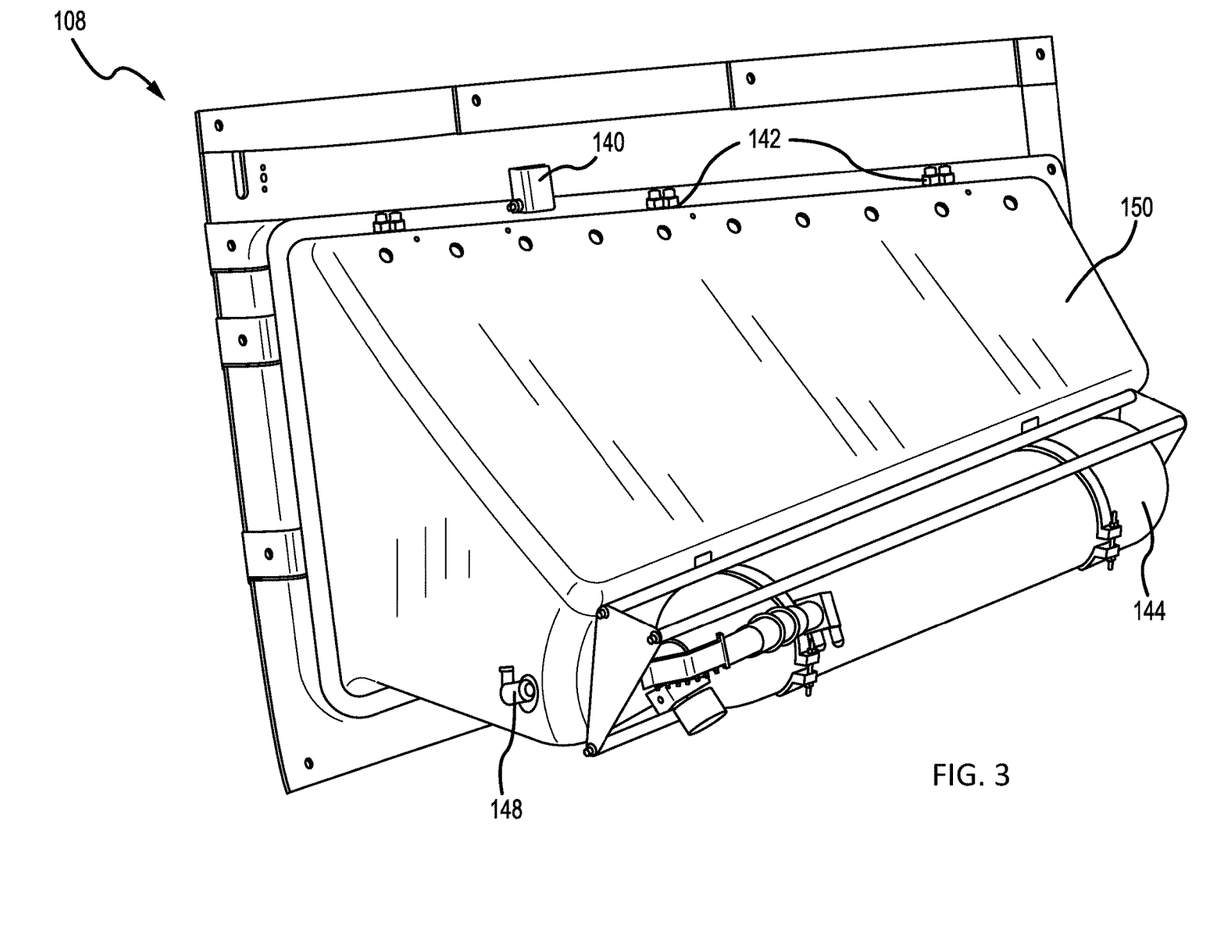
FIG. 3 illustrates an emergency evacuation assembly with a tank, in accordance with various embodiments.

With reference to FIG. 3, evacuation slide assembly 108 is shown as viewed from an inboard direction, in accordance with various embodiments. Evacuation slide assembly 108 may include housing 150 (also referred to as a packboard) with actuator 140 coupled to housing 150. Ball locks 142 may be coupled to housing 150 as well and configured to release panel 110 (of FIG. 1). Charged tank 144 may be mounted to the back of housing 150. Charged tank 144 may provide pressurized gas to inflate slide 122 (of FIG. 2) to inflate slide 122 be delivering the pressurized gas through an aspirator (illustrated below). Charged tank 144 may be pneumatically coupled to components of evacuation slide assembly 108 through inlet 148.

Figure 4:
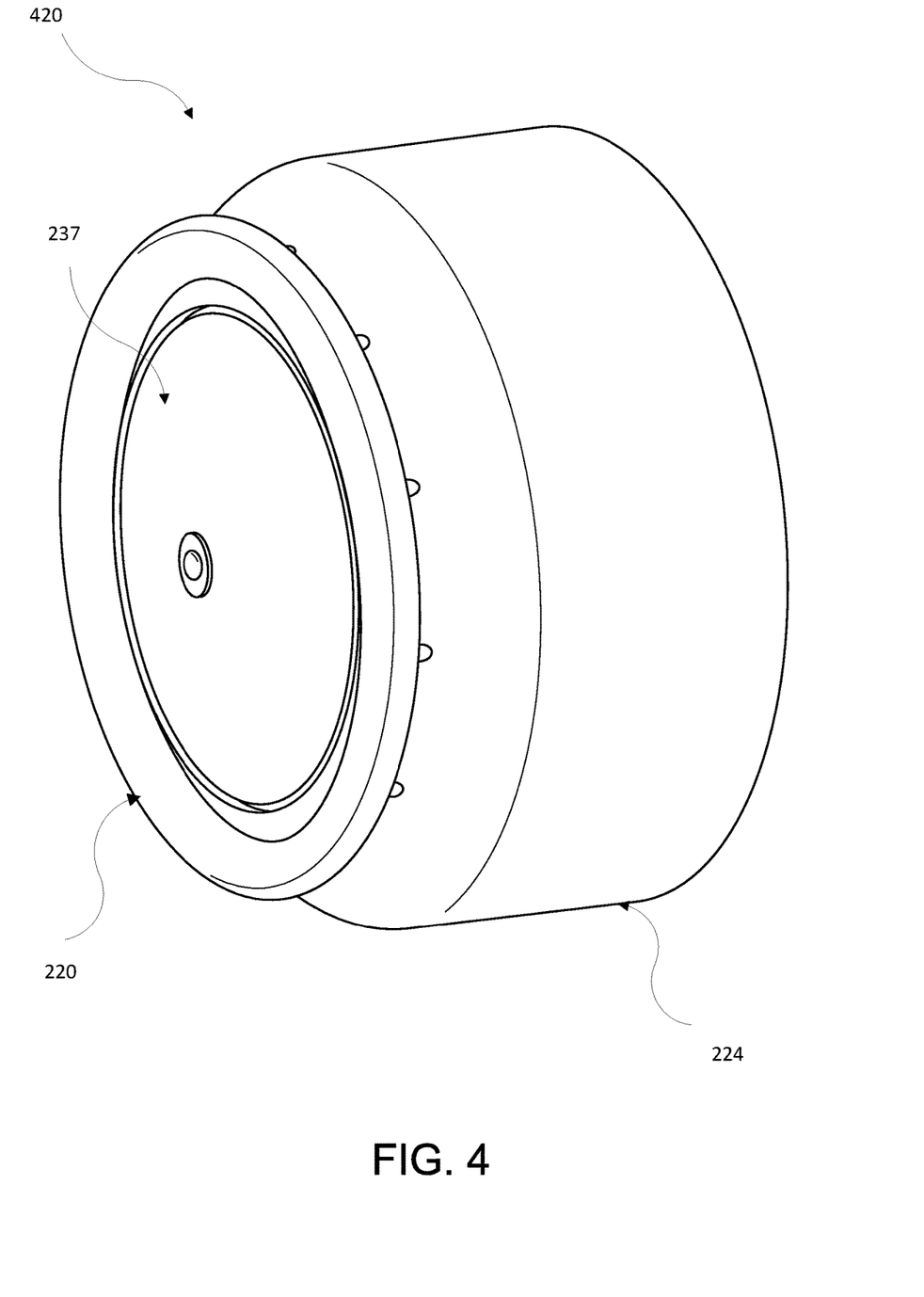
FIG. 4 illustrates an aspirator assembly, in accordance with various embodiments.

Referring now to FIG. 4, an aspirator assembly 420 is shown, in accordance with various embodiments. Aspirator assembly 420 includes an outer housing 224, an inner housing 310 (depicted in FIG. 5) a manifold 220, and a reverse flow check cap 237. In various embodiments, inner housing 310 and/or outer housing 224 may be made from various materials. Suitable materials may include metals, composites, plastics, molded materials, machined materials, or other suitable materials. For various embodiments, molded thermoplastics may provide suitable strength and light weight for a one-time use aspirator assembly 120. In various embodiments, molded housing may also be suitable for a multiple-use item. In various embodiments, where aspirator assembly 420 is used multiple times, stronger materials such as metals and/or composites may be used. Inner housing 310 and outer housing 224 are depicted as annular structures; however, any inner housing 310 and/or outer housing 224 may be formed with other suitable cross-sectional geometry. Suitable geometries may include polygonal, oval, circular, irregular, or other suitable shapes. For example, a square geometry may be used to provide relative anti-rotation between inner housing 310 and outer housing 224.

Figure 5:
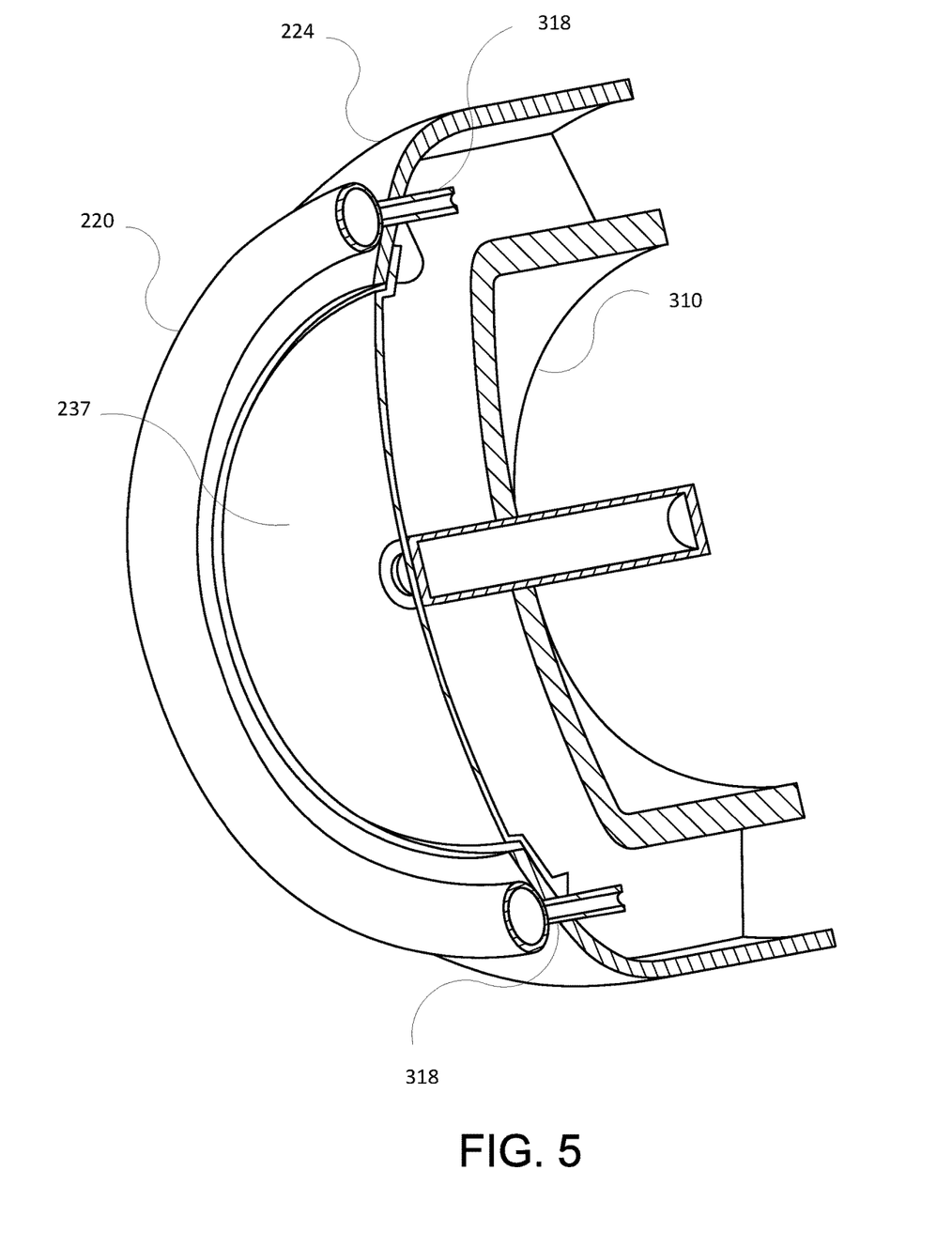
FIG. 5 illustrates a cross-sectional perspective of an aspirator assembly, in accordance with various embodiments.
Figure 6:
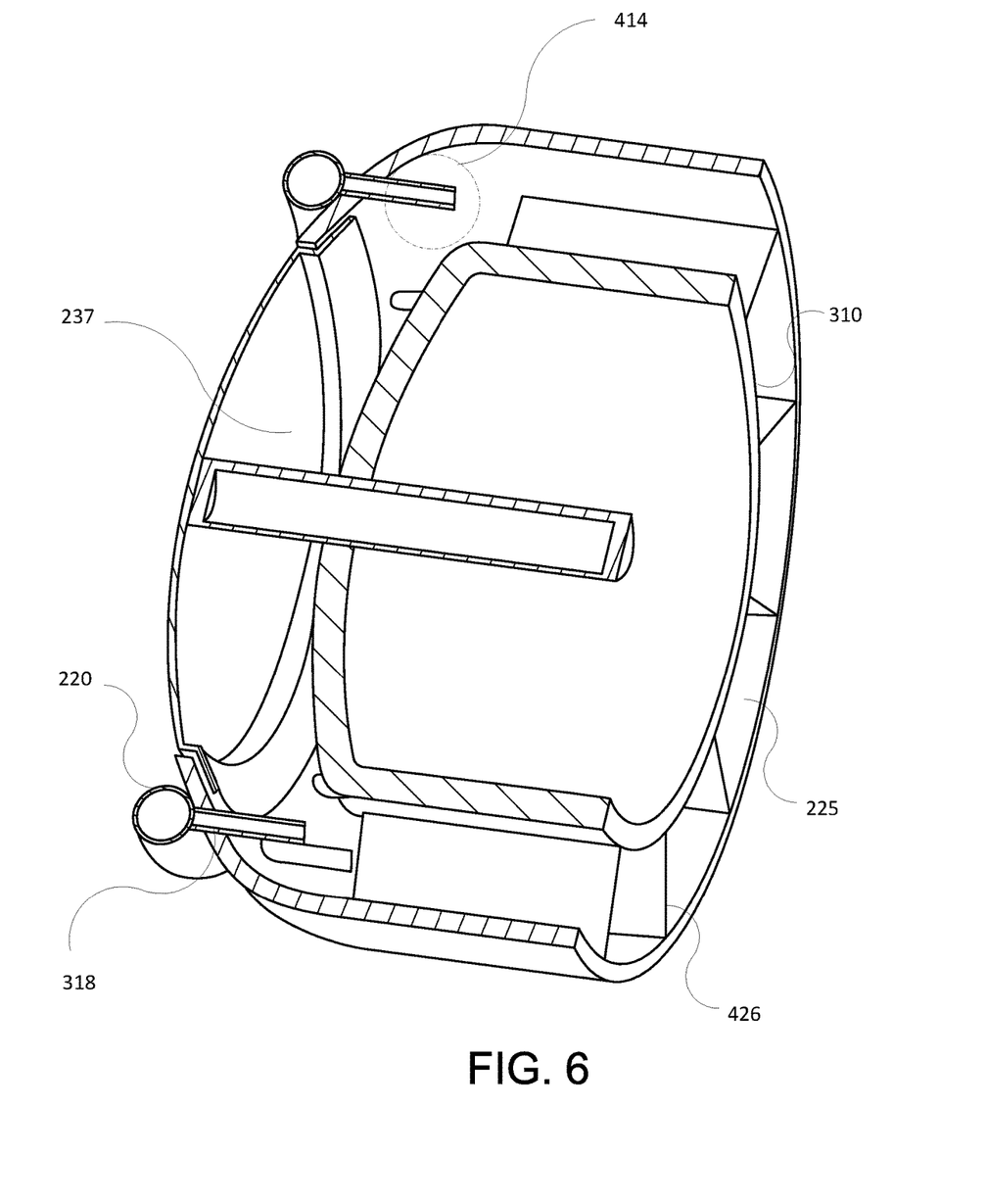
FIG. 6 illustrates a cross-sectional perspective of an aspirator assembly, in accordance with various embodiments.

FIG. 5 and FIG. 6 show a cross-section view of aspirator assembly 420 in various embodiments. In addition to outer housing 224, manifold 220, and check cap 237, FIG. 5 also depicts inner housing 310 and primary gas ejector nozzles 318 coupled to manifold 220. Annulus gap 414 and vanes 426 are depicted in FIG. 6 as part of aspirator assembly 420. Annulus gap 414 may be, for example, a gap between inner housing 310 and outer housing 224. A plurality of vanes 426 divide the annulus into segments (annulus segments 225) which may, for example, have approximately equal widths. The height of vanes 426, defined radially from the outer edge of inner housing 310 to the inner edge of outer housing 224 may also be approximately equal. Each annulus segment 225 is provided with a primary gas ejector nozzle 318, which is supplied pressurized gas from manifold 220.

In various embodiments, during operation of aspirator assembly 420, primary gas ejector nozzles 318 eject a pressurized gas at a high speed at a direction parallel to the cylindrical axis of the aspirator assembly 420. The pressurized gas flows at a direction parallel to the cylindrical axis of the aspirator assembly 420 and exits an open back side of aspirator assembly 420. When, for example, ambient air pressure located on the downstream side is not significantly greater than the ambient pressure on check cap 237, primary ejector nozzles 210 entrain air, and reduce the pressure in the head end of the aspirator assembly 420. Check cap 237 is subsequently pulled open, which allows ingestion of ambient air into the head end of aspirator assembly 420 to mix with the exhaust from primary gas ejector nozzles 318 and be ejected with the primary gas ejector nozzles 318 exhaust out the back side of aspirator assembly 420. As the downstream pressure of aspirator assembly 420 increases, which may occur when the inflatable device nears full inflation, ejector action may become less efficient. The ability of the ejection procedure to pull air through the head end of aspirator assembly 420 decreases. In response to a decrease in the mass flow rate of gas being ejected from nozzle 318, check cap 237 closes fully, and gas is thereafter supplied by primary gas ejector nozzles 318. In various embodiments, aspirator assembly 420 may be designed to have, for example, dimensional characteristics with a length of 3.75 inches, and overall diameter of 6.5 inches. Other comparable lengths may be used according to various embodiments.

In various embodiments, aspirator assembly 420 may include a joint that is connects a vane the inner housing and the outer housing using at least one of a braze, a weld, an adhesive, or a fastener. In various embodiments of aspirator assembly 420, check cap 237 may have a biasing member, such as a spring or spring assembly, coupled to check cap 237, where the biasing member is able to bias check cap 237 closed using a biasing force. In various embodiments, aspirator assembly 420 may include check cap 237 that is mounted to a biasing member assembly of inner housing 310 and abuts outer housing 224. In various embodiments, check cap 237 may have a closed state where check cap 237 abuts outer housing 224 and prevents fluid communication from the ambient environment into the annulus. In various embodiments of aspirator assembly 420, the biasing member is spring loaded.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. In various embodiments, the aspirator assembly disclosed herein may be used with an inflatable slide, and/or other inflatables such as rafts, airbags, etc.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiment Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An aspirator assembly for an inflatable device comprising:
   an outer housing disposed about an axis;
   an inner housing disposed about said axis;
   a manifold coupled through said outer housing to an annulus located between said inner housing and said outer housing, said manifold configured to provide pressurized gas to said annulus via a plurality of gas ejector nozzles, wherein a vane is disposed between said inner housing and said outer housing and the plurality of gas ejector nozzles are disposed in said annulus and in fluid communication with said manifold; and
   a check cap mounted to a biasing member assembly of said inner housing, the check cap is moveable with respect to the outer housing between a closed position and an open position, wherein the check cap abuts said outer housing in the closed position, and the check cap allows ingestion of ambient air into the annulus in the open position.

2. The aspirator assembly of claim 1, wherein said annulus is divided into a plurality of annulus segments by a plurality of vanes, including said vane, protruding radially from said inner housing.

3. The aspirator assembly of claim 1, wherein said vane protrudes radially from said inner housing and abuts said outer housing.

4. The aspirator assembly of claim 2, wherein said plurality of vanes that protrude radially from said inner housing connect mechanically to said outer housing to provide a length to width ratio sufficient to ensure complete mixing of a primary gas and entrained air.

5. The aspirator assembly of claim 3, wherein there is a joint between said abutment of said plurality of vanes with said inner housing and said outer housing.

6. The aspirator assembly of claim 5, wherein said vane is connected to said inner housing and said outer housing using at least one of a braze, a weld, an adhesive, or a fastener.

7. The aspirator assembly of claim 2, wherein said plurality of annulus segments are approximately equal in height extending radially from an edge of said inner housing to an edge of said outer housing.

8. The aspirator assembly of claim 1, wherein said annulus is a gap between said inner housing and said outer housing.

9. The aspirator assembly of claim 1 wherein said check cap has a biasing member coupled to said check cap, said biasing member being able to bias said check cap to the closed position using a biasing force.

10. The aspirator assembly of claim 9, wherein said biasing member is spring loaded.

11. An evacuation slide assembly, comprising:
a slide;
an aspirator assembly comprising:
an outer housing coupled to the slide;
an inner housing engaged with the outer housing;
a manifold coupled through said outer housing to an annulus located between said inner housing and said outer housing, said manifold providing pressurized gas to said annulus via a plurality of gas ejector nozzles; and
a check cap mounted to a biasing member assembly of said inner housing, the check cap is moveable with respect to the outer housing between a closed position and an open position, wherein the check cap abuts said outer housing in the closed position, and the check cap allows ingestion of ambient air into the annulus in the open position.

12. The evacuation slide assembly of claim 11, wherein said annulus is divided into a plurality of annulus segments by a plurality of vanes protruding radially from said inner housing.

13. The evacuation slide assembly of claim 12, wherein said plurality of vanes that protrude radially from said inner housing abut said outer housing.

14. The evacuation slide assembly of claim 12, wherein said plurality of vanes that protrude radially from said inner housing connect mechanically to said outer housing to prevent a dead zone from occurring in said annulus.

15. The evacuation slide assembly of claim 13, wherein there is a seal between said abutment of said plurality of vanes with said inner housing and said outer housing.

16. An aircraft having an evacuation slide assembly comprising:
a housing;
a panel covering the housing;
a slide retained within the housing;
an aspirator assembly coupled to the slide and comprising:
an outer housing coupled to the slide;
an inner housing engaged with the outer housing; and
a manifold coupled through said outer housing to an annulus located between said inner housing and said outer housing, said manifold providing pressurized gas to said annulus via a plurality of gas ejector nozzles; and
a check cap mounted to a biasing member assembly of said inner housing, the check cap is moveable with respect to the outer housing between a closed position and an open position,
wherein the check cap abuts said outer housing in the closed position, and the check cap allows ingestion of ambient air into the annulus in the open position.

17. The aircraft of claim 16, wherein said annulus is divided into a plurality of annulus segments by a plurality of vanes protruding radially from said inner housing.

18. The aircraft of claim 17, wherein said plurality of vanes that protrude radially from said inner housing circularly abut said outer housing.

19. The aircraft of claim 16, wherein the biasing member assembly biases said check cap towards the closed position using a biasing force.

* * * * *